United States Patent
Pham

(10) Patent No.: US 9,256,945 B2
(45) Date of Patent: Feb. 9, 2016

(54) SYSTEM FOR TRACKING A MOVING OBJECT, AND A METHOD AND A NON-TRANSITORY COMPUTER READABLE MEDIUM THEREOF

(71) Applicant: KABUSHIKI KAISHA TOSHIBA, Tokyo (JP)

(72) Inventor: Viet-Quoc Pham, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 159 days.

(21) Appl. No.: 14/200,768

(22) Filed: Mar. 7, 2014

(65) Prior Publication Data

US 2014/0286531 A1    Sep. 25, 2014

(30) Foreign Application Priority Data

Mar. 22, 2013  (JP) ................................ 2013-060973

(51) Int. Cl.
 *G06K 9/00* (2006.01)
 *G06T 7/00* (2006.01)

(52) U.S. Cl.
 CPC ..... *G06T 7/0028* (2013.01); *G06T 2207/10016* (2013.01); *G06T 2207/20081* (2013.01); *G06T 2207/30196* (2013.01)

(58) Field of Classification Search
 CPC ............ G06T 7/20; G06T 2207/30241; G06F 17/30811; H04N 5/144
 USPC ......................................................... 382/103
 See application file for complete search history.

(56) References Cited

U.S. PATENT DOCUMENTS

| | | | |
|---|---|---|---|
| 6,295,367 B1 * | 9/2001 | Crabtree | G01S 3/7865 382/103 |
| 7,623,674 B2 * | 11/2009 | Nichani | G06K 9/00778 340/545.1 |
| 2002/0167594 A1 * | 11/2002 | Sumi | G01S 3/7865 348/208.14 |

(Continued)

OTHER PUBLICATIONS

Khamis, S., Morariu, V.I., Davis, L.S.: Combining per-frame and per-track cues for multi-person action recognition. In: Fitzgibbon, A., Lazebnik, S., Perona, P., Sato, Y., Schmid, C. (eds.) ECCV 2012, Part I. LNCS, vol. 7572, pp. 116-129. Springer, Heidelberg (2012).*

(Continued)

*Primary Examiner* — Nirav G Patel
*Assistant Examiner* — Ian Lemieux
(74) *Attorney, Agent, or Firm* — Nixon & Vanderhye, P.C.

(57) ABSTRACT

According to one embodiment, a plurality of moving objects is detected from a plurality of frames acquired in time series. Each of the moving objects is corresponded among the frames. A tracklet of each moving object corresponded is extracted and stored. A frame to calculate a position of a moving object is set to a notice frame. The frames are grouped into a first block including at least the notice frame, a second block positioned before the first block in time series, and a third block positioned after the first block in time series. A secondary tracklet included in the second block is acquired from the stored tracklets. The secondary tracklet is corresponded with tracklets included in the first block and the third block, based on a similarity between the secondary tracklet and each of the tracklets. The secondary tracklet is associated with the corresponded tracklets, as a tertiary tracklet.

10 Claims, 6 Drawing Sheets

(56) References Cited

U.S. PATENT DOCUMENTS

| | | | |
|---|---|---|---|
| 2009/0202108 A1* | 8/2009 | Faeldt | G06T 7/20 382/103 |
| 2011/0002509 A1* | 1/2011 | Nobori | G06T 7/2006 382/103 |
| 2013/0050502 A1 | 2/2013 | Saito et al. | |
| 2013/0051624 A1* | 2/2013 | Iwasaki | G06T 7/2033 382/103 |
| 2014/0286529 A1* | 9/2014 | Sprenger | G06K 9/00127 382/103 |
| 2014/0321704 A1* | 10/2014 | Partis | G06K 9/00771 382/103 |

OTHER PUBLICATIONS

R. Rosales, S. Sclaroff.: Improved tracking of multiple humans with trajectory prediction and occlusion modelling. IEEE CVPR Workshop on the Interpretation of Visual Motion (1998).*

Dalal, N. et al., "Histograms of Oriented Gradients for Human Detection", IEEE Computer Science Conference on Computer Vision and Pattern Recognition, (2005), 8 pages.

Zhang, K. et al., "Real-Time Compressive Tracking", ECCV, Part III, (2012), pp. 866-879.

Zhang, L. et al., "Global Data Association for Multi-Object Tracking Using Network Flows", Proceeding of IEEE Conference on Computer Vision and Pattern Recognition, (2008), 8 pages.

* cited by examiner

US 9,256,945 B2

SYSTEM FOR TRACKING A MOVING OBJECT, AND A METHOD AND A NON-TRANSITORY COMPUTER READABLE MEDIUM THEREOF

CROSS-REFERENCE TO RELATED APPLICATION

This application is based upon and claims the benefit of priority from Japanese Patent Application No. 2013-060973, filed on Mar. 22, 2013; the entire contents of which are incorporated herein by reference.

FIELD

Embodiments described herein relate generally to a system for tracking a moving object, and a method and a non-transitory computer readable medium thereof.

BACKGROUND

As a conventional technique, a system for tracking a moving object is disclosed. As to this system, in time sequence images, a plurality of moving objects is detected from a plurality of frames included therein. By corresponding the same object among the frames, the moving object is tracked. This tracking result is recorded. Based on the tracking result, the moving object is discriminated.

Furthermore, in this system, a person's face is detected from the time series images. Specifically, appearance and disappearance of the face are detected therefrom. By setting appearance of the face, disappearance of the face, and failure of detection of the face to each node, a combination of branches (path) having nodes is examined. Here, the plurality of moving objects is complicatedly moving in the time series images. Accordingly, a cost to calculate the combination of branches greatly increases.

DETAILED DESCRIPTION

According to one embodiment, a moving object tracking system includes an acquisition unit, a detection unit, an extraction unit, a control unit, a setting unit, a grouping unit, a correspondence unit, and an association unit. The acquisition unit is configured to acquire a plurality of frames in time series. The detection unit is configured to detect a plurality of moving objects from the frames. The extraction unit is configured to correspond each of the moving objects among the frames, and to extract a tracklet of each moving object corresponded. The control unit is configured to store the tracklet of each moving object corresponded. The setting unit is configured to set a frame to calculate a position of a moving object to a notice frame. The grouping unit is configured to group the frames into a first block including at least the notice frame, a second block positioned before the first block in time series, and a third block positioned after the first block in time series. The correspondence unit is configured to acquire a secondary tracklet included in the second block from the control unit, and to correspond the secondary tracklet with tracklets included in the first block and the third block, based on a similarity between the secondary tracklet and each of the tracklets. The association unit is configured to associate the secondary tracklet with the corresponded tracklets, as a tertiary tracklet.

Various embodiments will be described hereinafter with reference to the accompanying drawings.

The First Embodiment

Figure 1:
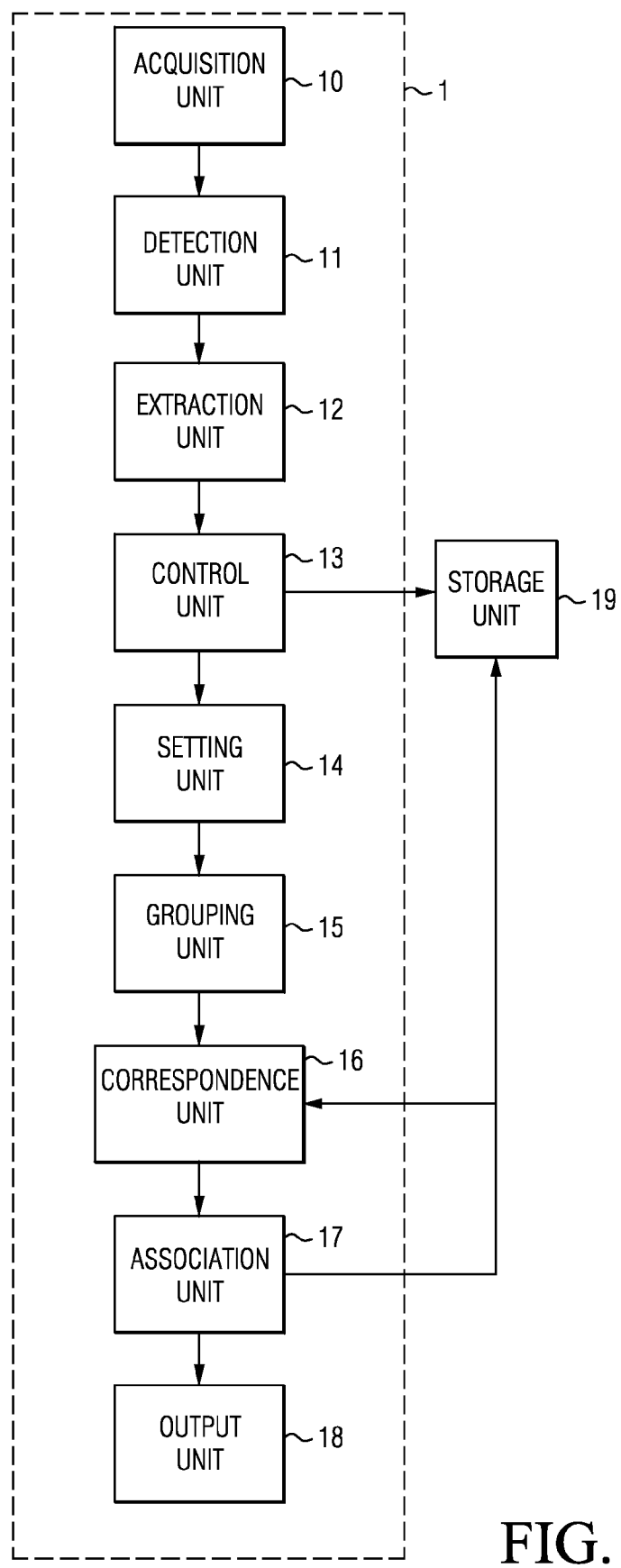
FIG. 1 is a block diagram of a moving object tracking system according to the first embodiment.

FIG. 1 is a block diagram of a moving object tracking system 1 according to the first embodiment. As shown in FIG. 1, the moving object tracking system 1 includes an acquisition unit 10, a detection unit 11, an extraction unit 12, a control unit 13, a setting unit 14, a grouping unit 15, a correspondence unit 16, an association unit 17, an output unit 18, and a storage unit 19. For example, the moving object tracking system 1 may be realized by executing a program (i.e., software) with a processing device such as CPU (Central Processing Unit). Alternatively, the moving object tracking system 1 may be realized by hardware such as IC (Integrated Circuit) or by using both software and hardware. A video acquired by the acquisition unit 10 may be stored in a storage device.

For example, the storage device may be realized as any of storage devices storable magnetically, optically, or electrically, such as HDD (Hard Disk Drive), SSD (Solid State Drive), ROM (Read Only Memory), or memory card.

Figure 2:
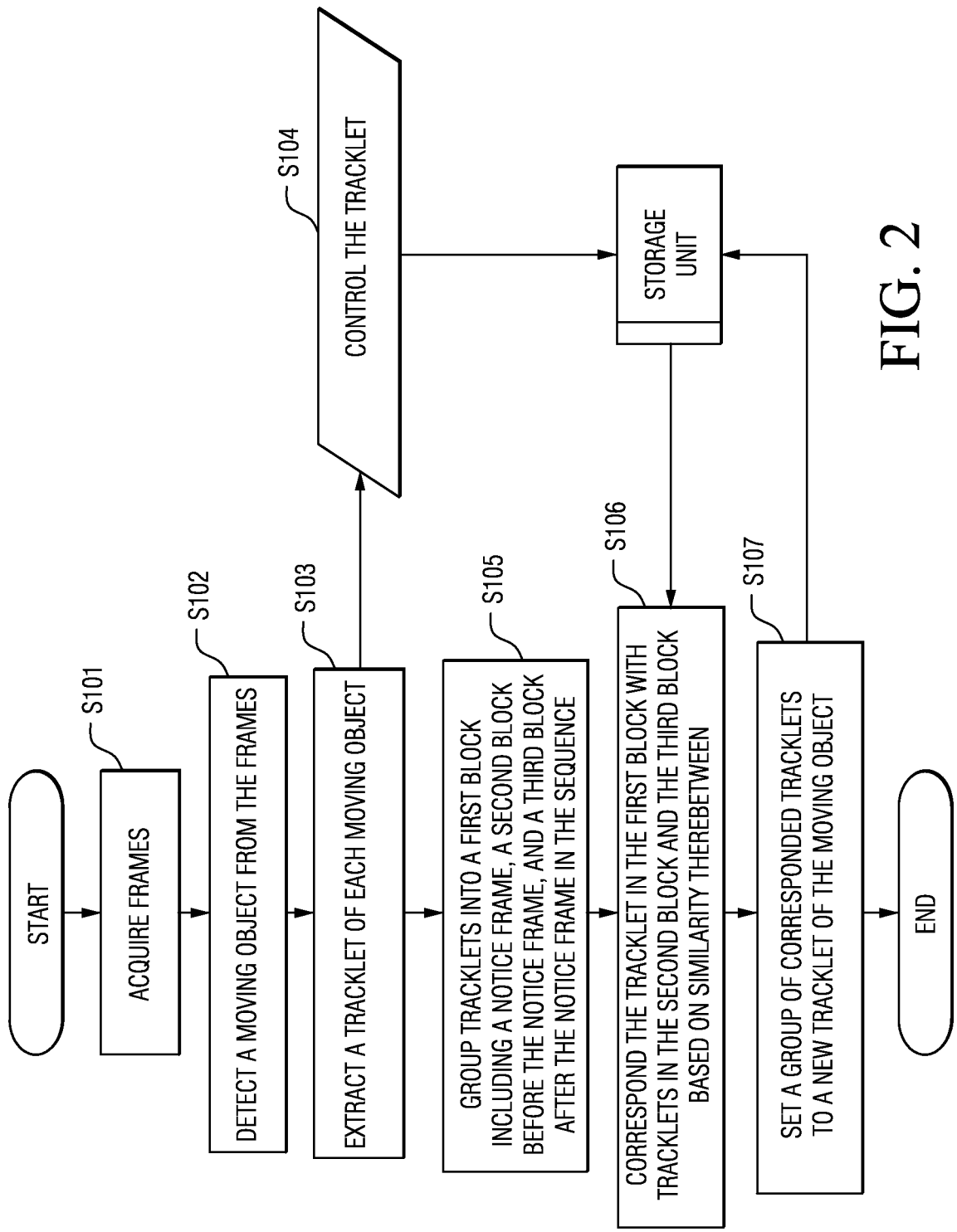
FIG. 2 is a flow chart of processing of the moving object tracking system in FIG. 1.

FIG. 2 is a flow chart of one example of processing of the moving object tracking system 1 according to the first embodiment. First, in the moving object tracking system 1, the acquisition unit 10 acquires a video photographed by an imaging device or stored in the storage device (S101). The video comprises a plurality of frames (images).

Next, the detection unit 11 detects a plurality of moving images from the video acquired by the acquisition unit 10 (S102). For example, the moving object is a person or a vehicle. Hereafter, an example that the moving object is a person will be explained. As a concrete method for detecting the person, following technique can be applied.

N. Dalal, B. Triggs, "Histograms of Oriented Gradients for human Detection", IEEE Computer Vision and Pattern Recognition, pp. 886-893, 2005

Furthermore, by using Visual Tracking technique, as to an object detected from a previous frame of a target frame, the object is tracked, and a position of this object in the target frame is estimated. As a result, accuracy of detection of the person is improved. Following technique can be applied.

K. Zhang, L. Zhang, M. H. Yang, "Real-time compressive Tracking", European Conference Computer Vision, pp. 866-879, 2012

Next, the extraction unit 12 corresponds each person among successive frames, and extracts a moving trajectory (Hereafter, it is called "tracklet") of the corresponded person (S103). As a method for extracting a tracklet, following technique can be applied.

H. Pirsiavash, D. Ramanan, C. C. Fowlkes, "Globally-Optimal Greedy Algorithms for Tracking a Variable Number of Objects", IEEE Computer Vision and Pattern Recognition, pp. 1201-1208, 2012

Next, the control unit 13 controls (manages) the tracklet of each person (S104). As to the tracklet, which time segment (in the video) includes the moving person is managed. The time segment may be managed by a frame number of the image, or replay/record time. Furthermore, the detection unit 11 may store the time segment with a position or a size of the person detected thereby. This information is stored in the storage unit 19. Here, the tracklet of each person and ID of the person may be stored in the storage unit 19. The ID of the person is only assigned so as to discriminate each other, and may not identify the person himself/herself.

Next, the setting unit 14 sets a frame for calculating a position of the person to a notice frame (S105).

Figure 3:
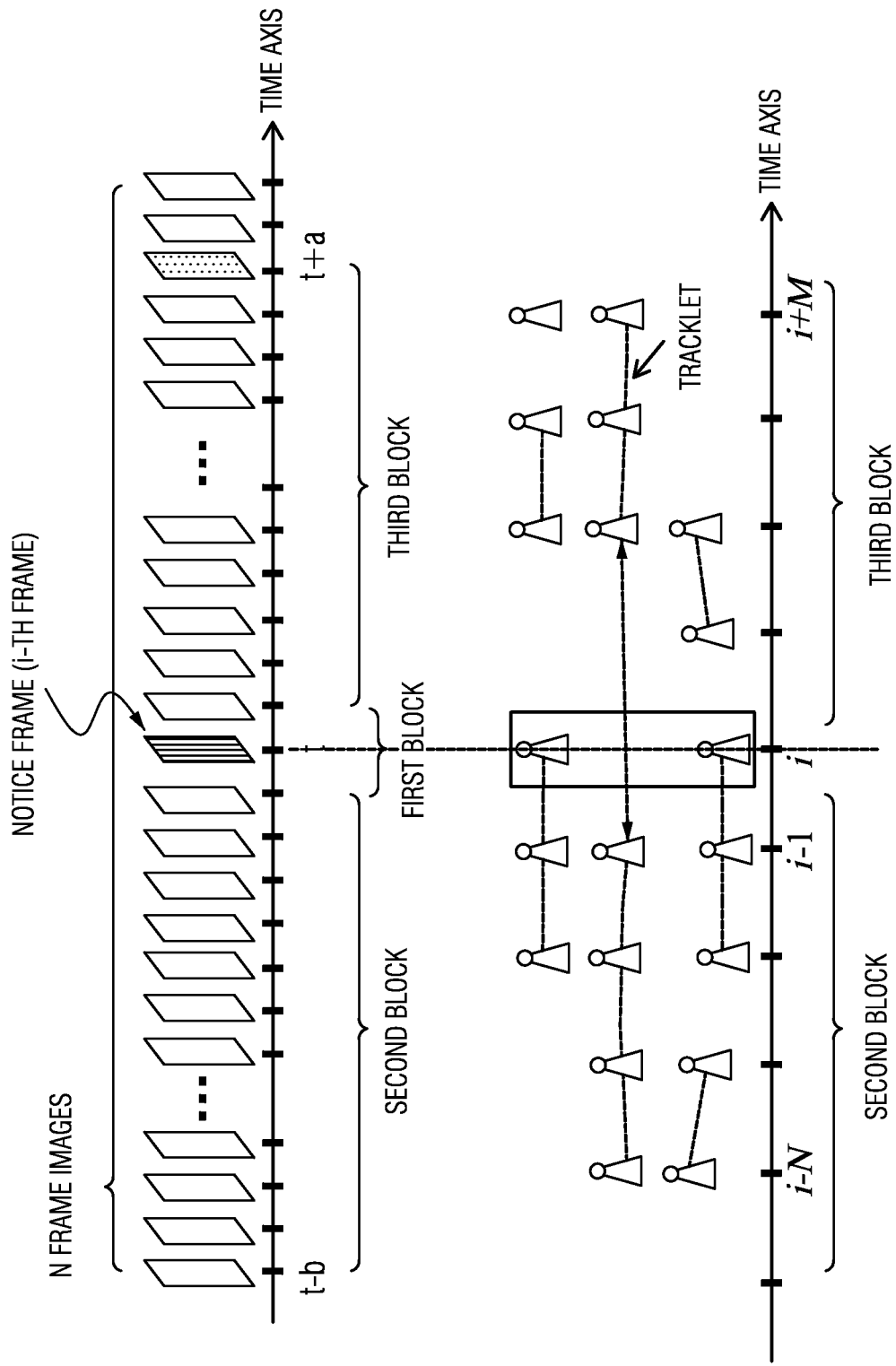
FIG. 3 is a schematic diagram to explain an example of grouping of tracklets according to the first embodiment.

Next, as to a plurality of tracklets extracted, the grouping unit 15 groups the frames into a first block including the notice frame, a second block positioned before the first block in time series, and a third block positioned after the first block in time series (S105). For example, as shown in FIG. 3, among N frames (images), if a frame (i-th frame) at time t is set to a notice frame, a block including the i-th frame is the first block, a block positioned before the first block in time series is the second block, and a block positioned after the first block in time series is the third block. More specifically, following equation (1) is used.

$$\begin{aligned} \text{The second block} &= \{\text{tracklet } t: \text{end}(t) < i\} \\ \text{The third block} &= \{\text{tracklet } t: \text{start}(t) \geq i\} \\ \text{The first block} &= \{\text{tracklet } t: \text{start}(t) < i \leq \text{end}(t)\} \end{aligned} \quad (1)$$

In the equation (1), start(t) is the frame number of a start frame of tracklet t, and end(t) is the frame number of an end frame of tracklet t.

Next, the correspondence unit 16 acquires a tracklet included in the second block from the control unit 13, and corresponds the tracklet with tracklets included in the first block and the third block based on a similarity therebetween (S106).

This processing is executed by two steps, i.e., selection of tracklets in the second block and selection of tracklets in the third block.

First, in the selection of tracklets in the second block, "ap" satisfying "end (ap)=i−1" is selected from the second block. Here, "i" is the notice frame. More specifically, a tracklet of which length is smaller than (or equal to) a threshold is selected from the second block. As to a tracklet terminated before (i−1)-th frame in time series, this is already processed before this processing flow. Accordingly, this tracklet is excluded. In this case, by largely reducing the number of candidates (tracklets) to be corresponded, the processing time can be greatly reduced.

Furthermore, in the selection of tracklets in the third block, as to each "ap" selected at a previous step, this is corresponded with a tracklet "bq" satisfying a following equation (2) in the third block.

$$\begin{aligned} D(ap, bq) &\geq D(ap, bk) \quad \forall\, bk \in 3rdblock \\ D(ap, bq) &\geq D(cr, bq) \quad \forall\, cr \in 1stblock \end{aligned} \quad (2)$$

In the equation (2), "D(,)" represents correspondentability between two tracklets, which is calculated from similarity of motion and similarity of appearance between tracklets.

$$D(t1,t2)=\text{MotionMatch}(t1,t2)\times \text{AppearanceMatch}(t1,t2) \quad (3)$$

Figure 4:
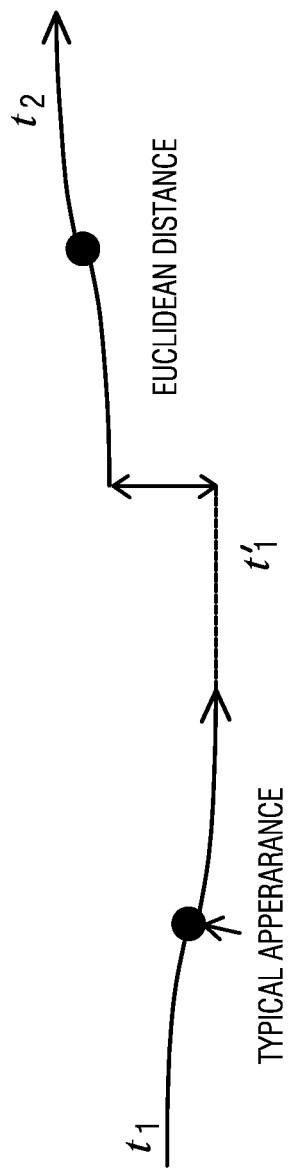
FIG. 4 is a schematic diagram to explain an example of calculation using an Euclidean distance according to the first embodiment.

As to the similarity of motion "MotionMatch(t1, t2)", t1 is assumed that a person is linearly moving in a short time between tracklets t1 and t2. Here, t1 is extended to t1' until a start time of t2. As shown in FIG. 4, this extension is calculated by Euclidean distance.

$$\text{MotionMatch}(t1,t2)=\text{Distance}(\text{end}(t1'),\text{start}(t2)) \quad (4)$$

Furthermore, as to the similarity of appearance "AppearanceMatch(t1,t2)", a typical appearance of the person is selected from each tracklet. Here, by extracting a feature from two typical appearances and by comparing therewith, the similarity of appearance is calculated. As to selection of the typical appearance, as shown in FIG. 4, a person's appearance included in the tracklets is selected. Furthermore, as a method for extracting and comparing the feature, following technique can be applied.

K. Zhang, L. Zhang, M. H. Yang, "Real-time compressive Tracking", European Conference Computer Vision, pp. 866-879, 2012

Here, if the tracklet-extraction result corresponding to the person-extraction result is not included in the second block, by executing the same processing as S101~S104 explained in FIG. 2, the person and the tracklet can be extracted.

The association unit 17 associates a group of tracklets corresponded by the correspondence unit 16 as a new tracklet. The control unit 13 controls (manages) the detection result by the detection unit 11 and the tracklet associated by the association unit 17.

The output unit 18 outputs a result of the person and the tracklet corresponded thereto. The person and the tracklet (corresponded) may be displayed by superimposing on the video. Alternatively, only a result of tracklet of the desired person may be outputted. By superimposing the person and the tracklet (corresponded), a complicated locus is clearly understood by a user. Furthermore, as to only the notice frame, an ID and a position of the person may be outputted. As mentioned-above, the ID of the person is only assigned so as to discriminate each other, and may not identify the person himself/herself.

As mentioned-above, according to the moving object tracking system 1 of the first embodiment, even if a plurality of objects are complicatedly moving, a cost to calculate the tracklet can be reduced. Especially, by using a tracklet in the second block, the correspondence unit 16 associates this tracklet with tracklets in the first block and the third block. Accordingly, double calculation to correspond tracklets among the first block, the second block and the third block, is not necessary. As a result, this calculation cost can be reduced.

The Second Embodiment

Figure 5:
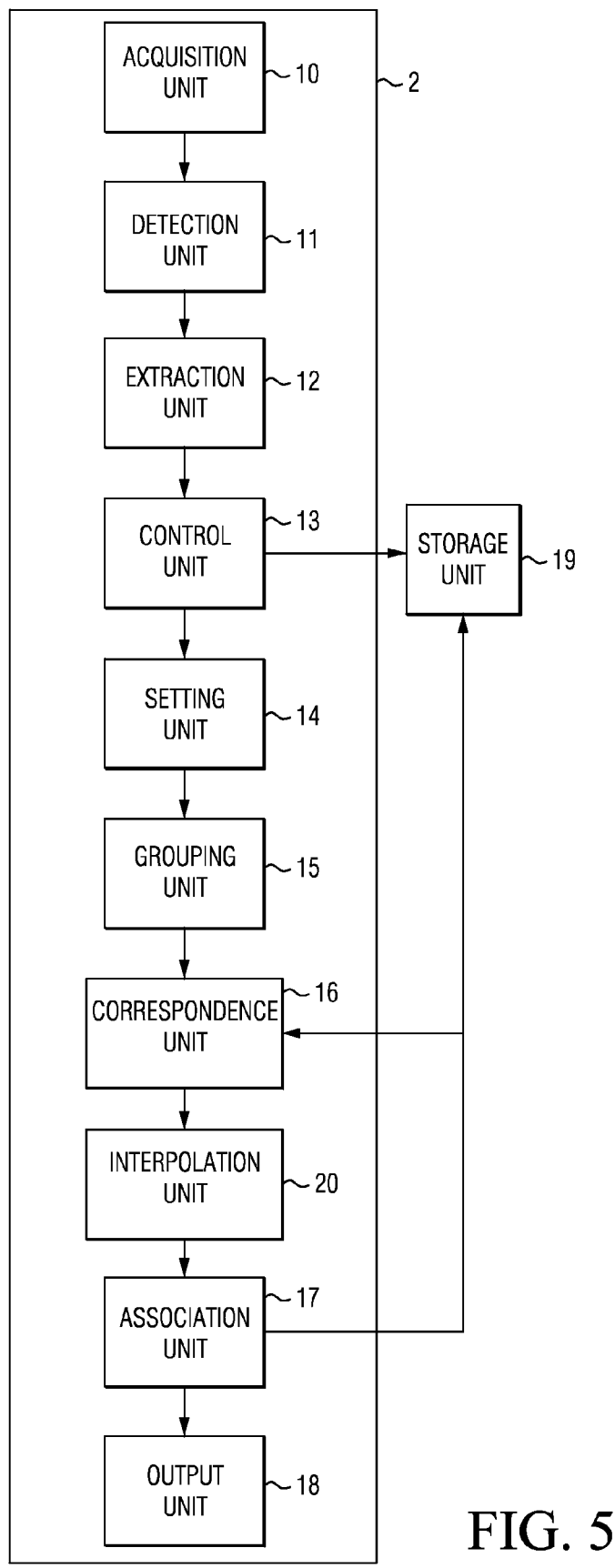
FIG. 5 is a block diagram of a moving object tracking system according to the second embodiment.

FIG. 5 is a block diagram of a moving object tracking system 2 according to the second embodiment. As shown in FIG. 2, the moving object tracking system 2 includes the acquisition unit 10, the detection unit 11, the extraction unit 12, the control unit 13, the setting unit 14, the grouping unit 15, the correspondence unit 16, an interpolation unit 20, the association unit 17, the output unit 18, and a storage unit 19. The interpolation unit 20 is different from the first embodiment.

The interpolation unit 20 interpolates position information of the person included in the first block from tracklets of each person corresponded between the second block and the third block. Here, the position information include any of a position of the person in a frame, a size of the person in the frame, and a tracklet prior to the notice frame in time series.

Specifically, undetected positions of the person between tracklets corresponded by the correspondence unit 16 in time series are interpolated. Assume that two corresponded tracklets are (t1, t2), a position, a size and a frame number of the person at an end timing of t1 is ([x1,y1], [h1,w1],f1), and a position, a size and a frame number of the person at a start timing of t2 is ([x2,y2], [h2,w2],f2). By defining "df=f2−f1", as to each frame f1+s in [f1+1, . . . , f1+df−1], a position and a size of the person ([xs,ys], [hs,ws]) is estimated by a following equation (5).

$$[xs, ys] = [x1, y1] + [x2 - x1, y2 - y1] \times s/df$$
$$[hs, ws] = [h1, w1] + [h2 - h1, w2 - w1] \times s/df$$
(5)

By using the correspondence result (of the correspondence unit 16) and the estimation result (of the interpolation unit 20), the output unit 18 outputs a position of the person in the notice frame. Furthermore, the size and the corresponded tracklet prior to the notice frame in time series may be outputted with the position.

By using the correspondence result (of the correspondence unit 16) and the interpolation result (of the interpolation unit 20), the association unit 17 may associate the corresponded tracklets and the interpolated region of the person with a new tracklet.

Here, a concrete example that interpolation is necessary will be explained by referring to FIG. 6.

Figure 6:
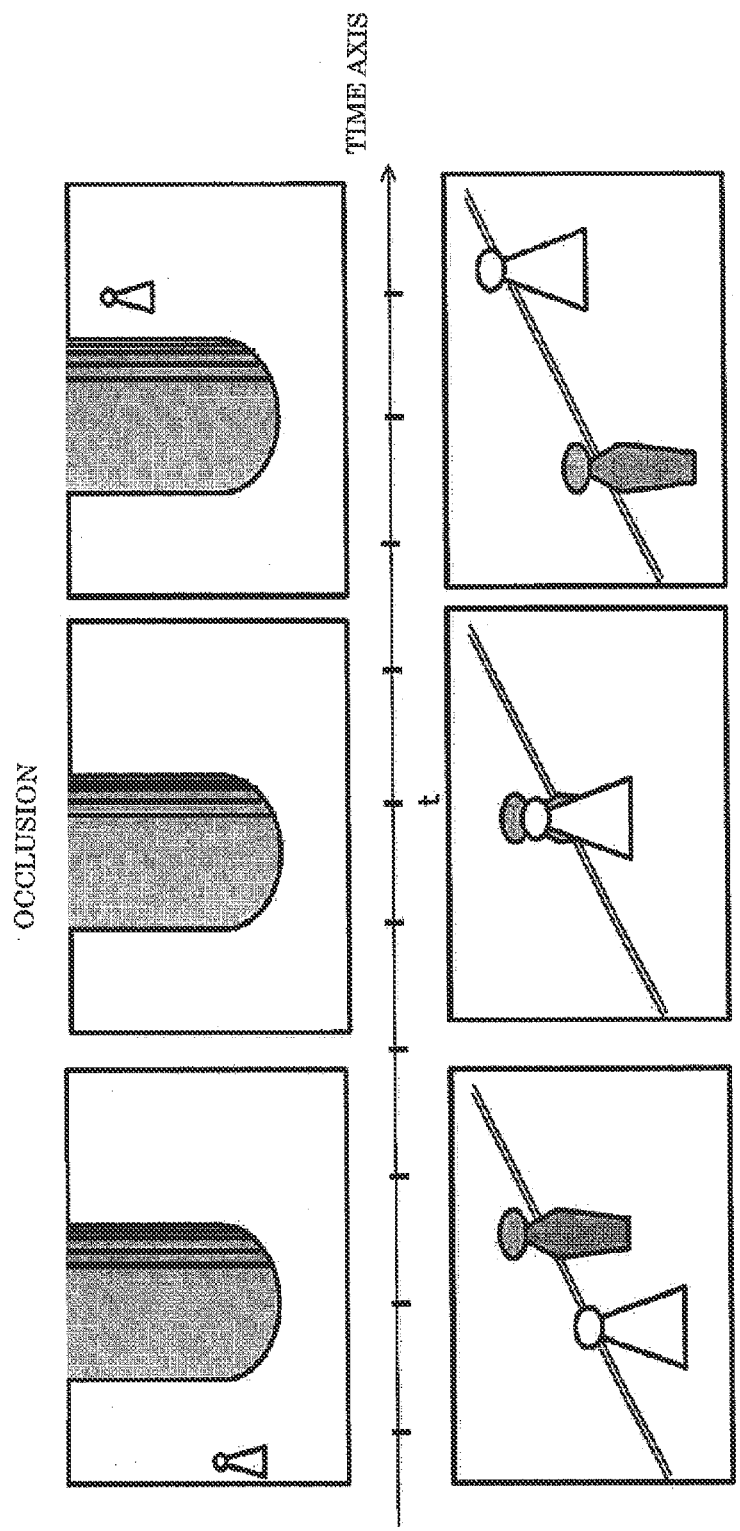
FIG. 6 is a schematic diagram to explain occlusion of a moving object in frames according to the second embodiment.

FIG. 6 is a schematic diagram of occlusion caused by the first case (upper row) that a walking person is hidden by a building and the second case (lower row) that two persons are passing each other. Along a time axis in FIG. 6, situation changed from the left side to the right side is shown.

For example, if two persons are passing each other (lower row in FIG. 6), the same person can be corresponded before and after the crossing timing from a velocity of the person's walking. As to the velocity, by deciding whether the moving object is a person or a vehicle, and by previously training an averaged velocity, the occlusion time can be estimated.

If the walking person is hidden by the building (upper low in FIG. 6), in the same way as the second case, the occlusion time is estimated. For example, whether a building to occlude the person exists around a scene to be photographed is previously decided. If the moving object is a vehicle, whether a building to occlude the vehicle exists around the scene is previously decided. Alternatively, position information of this building is previously acquired. As a result, the occlusion time can be estimated.

From the occlusion time estimated, a suitable length of the first block may be set. For example, in a general monitoring video, a length M of the first block is set to double the frame rate (i.e., the number of frames in two seconds). By setting the occlusion time, the estimation can be suitably coped with change of environment due to the building or traffic amount. As a result, the person can be tracked more stably.

As mentioned-above, according to the moving object tracking system 2 of the second embodiment, even if a plurality of objects are complicatedly moving, a cost to calculate the tracklet can be reduced. Especially, by the interpolation, even if an entire tracking result of the person is unknown, the tracking result at the notice frame can be outputted.

(Hardware Component)

The moving object tracking system of above-mentioned embodiments equips a control device such as CPU (Central Processing Unit), a storage device such ROM or RAM, an external storage device such as HDD or SSD, a display device such as a display, an input device such as a mouse or a keyboard, and an imaging device such as a camera. Namely, the moving object tracking system can be realized with a hardware component using a regular computer.

A program executed by the apparatus of above-mentioned embodiments is provided by previously being installed into the ROM and so on.

Furthermore, this program may be provided by being stored into a computer-readable memory medium such as CD-ROM, CD-R, a memory card or a flexible disk (FD), with a file of installable format or executable format.

Furthermore, this program may be provided by being stored into a computer connected to a network such as Internet, and by being downloaded via the network. Furthermore, this program may be provided or distributed via the network such as Internet.

As to the program executed by the apparatus of above-mentioned embodiments, each unit is composed as a module to be realized on the computer. As an actual hardware, for example, by reading the program from the external storage device to the storage device and by executing the program with the control device, each unit is realized on the computer.

As mentioned-above, according to the moving object tracking system of above-mentioned embodiments, even if a plurality of objects are complicatedly moving, a cost to calculate the tracklet can be reduced. Especially, by using a tracklet in the second block, this tracklet is associated with tracklets in the first block and the third block. Accordingly, double calculation to correspond tracklets among the first block, the second block and the third block, is not necessary.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system for tracking a moving object, the system comprising processing circuitry configured to at least:

acquire a plurality of frames in time series;

detect a plurality of moving objects from the frames;

correspond each of the moving objects among the frames, and extract a tracklet of each moving object corresponded;

store the tracklet of each moving object corresponded;

set a frame to calculate a position of a moving object to a notice frame;

group the frames into a first block including at least the notice frame, a second block positioned before the first block in time series, and a third block positioned after the first block in time series;

acquire a secondary tracklet included in the second block, and correspond the secondary tracklet with tracklets included in the first block and the third block, based on a similarity between the secondary tracklet and each of the tracklets; and associate the secondary tracklet with the corresponded tracklets, as a tertiary tracklet.

2. The system according to claim 1, wherein the processing circuitry is configured to correspond the secondary tracklet of which a length is smaller than or equal to a predetermined threshold.

3. The system according to claim 1, wherein the processing circuitry is further configured to:

interpolate position information of the moving object included in the first block, based on the tertiary tracklet.

4. The system according to claim 1, wherein the processing circuitry is configured to decide whether the moving object is a person or a vehicle, and if the moving object is the person or the vehicle, the processing circuitry is configured to set a length of the first block, based on a previously trained time while the moving object is overlapped with another moving object.

5. The system according to claim 1, wherein the processing circuitry is further configured to:

acquire surrounding information of the moving object;

wherein a length of the first block is set, based on a time while the moving object is occluded, and the time is previously trained from the surrounding information.

6. The system according to claim 1, wherein the processing circuitry is configured to calculate the similarity as a product of a similarity of an appearance of the moving object in the tracklet, and a similarity of a motion of the tracklet.

7. The system according to claim 1, wherein the processing circuitry is further configured to:

detect a position of the moving object included in a frame and a frame number of the frame for each moving object, and store the tracklet having the position and the frame number of each moving object corresponded.

8. The system according to claim 7, wherein the processing circuitry is further configured to:

set a point to calculate the position of the moving object onto the notice frame, and group tracklets into the first block, the second block and the third block.

9. A method for tracking a moving object, comprising:

acquiring a plurality of frames in time series;

detecting a plurality of moving objects from the frames;

corresponding each of the moving objects among the frames;

extracting a tracklet of each moving object corresponded;

storing the tracklet of each moving object corresponded;

setting a frame to calculate a position of a moving object to a notice frame;

grouping the frames into a first block including at least the notice frame, a second block positioned before the first block in time series, and a third block positioned after the first block in time series;

acquiring a secondary tracklet included in the second block from the stored tracklets;

corresponding the secondary tracklet with tracklets included in the first block and the third block, based on a similarity between the secondary tracklet and each of the tracklets; and associating the secondary tracklet with the corresponded tracklets, as a tertiary tracklet.

10. A non-transitory computer readable medium storing a program for causing a computer to perform operations for tracking a moving object, the operations comprising:

acquiring a plurality of frames in time series;

detecting a plurality of moving objects from the frames;

corresponding each of the moving objects among the frames;

extracting a tracklet of each moving object corresponded;

storing the tracklet of each moving object corresponded;

setting a frame to calculate a position of a moving object to a notice frame;

grouping the frames into a first block including at least the notice frame, a second block positioned before the first block in time series, and a third block positioned after the first block in time series;

acquiring a secondary tracklet included in the second block from the stored tracklets;

corresponding the secondary tracklet with tracklets included in the first block and the third block, based on a similarity between the secondary tracklet and each of the tracklets; and associating the secondary tracklet with the corresponded tracklets, as a tertiary tracklet.

* * * * *